Inventor
Donald Weighton
Ladislav Lax
By Emery Holcombe & Blair
Attorney

Inventor
Donald Weighton
Ladislav Lax
By
Emery Holcombe & Blair
Attorney

Patented Mar. 2, 1954

2,671,130

UNITED STATES PATENT OFFICE 2,671,130

COMBINED TELEVISION AND SOUND SYSTEM

Donald Weighton and Ladislav Lax, Cambridge, England, assignors to Pye Limited, Cambridge, England, a British company Application November 19, 1951, Serial No. 257,081

Claims priority, application Great Britain November 21, 1950

5 Claims. (Cl. 178—5.6)

The present invention relates to a combined television and sound system in which the speech or other sound modulation is transmitted as a series of modulated pulses on the same carrier as the picture intelligence and the synchronising signals, the modulated pulses being transmitted during the interline blanking periods, and preferably during the line synchronising pulses. Combined television and sound systems of this type are described in British specifications Nos. 564,511 and 621,479.

Such systems work on the principle that the sound waveform occurring during each picture line is sampled, for example by gating pulses of line frequency, these samples being used to produce a train of pulses which are width or amplitude modulated in accordance with the samples, the modulated pulses being delayed or otherwise timed with respect to the television waveform so that they occur during the interline blanking periods and then being mixed with the television waveform so that they occur in the composite waveform during the interline blanking period. After detection in the receiver, the sound pulses are separated from the composite waveform and diverted through a sound channel in which the pulses are demodulated, the demodulated output operating a sound reproducing device.

A disadvantage of such systems is that they are only capable of utilising one half of the frequency band determined by the pulse repetition frequency. With the standard British television waveform this is approximately 10 kc./s. This means that the frequency spectrum will be distributed around 0, 10 kc./s., 20 kc./s. and all the harmonics of 10 kc./s. Consequently, to prevent overlapping, sound frequencies only up to approximately 5 kc./s. can be transmitted. This limitation consequently restricts the fidelity and quality of the sound which can be transmitted.

The present invention has for an object to provide a combined television and sound system of the above kind which overcomes the above disadvantages and enables the sound frequencies which can be transmitted to be raised to a multiple of half the line repetition frequency, that is, for example, to 10 kc./s., 15 kc./s. or, any within practical limits, to other multiple of 5 kc./s.

According to the present invention the sound waveform is sampled a plurality of times during each line period, the samples being caused to produce modulated pulses which are diverted through a corresponding number of separate channels, that is so that the pulses corresponding to the first sample during each line period are diverted into one channel, the pulses corresponding to the second sample during each line period to a second channel and so on, wherein the pulses in the different channels are delayed by different amounts so that the plurality of pulses corresponding to the samples of a single line period become arranged, in a common output from the channels, in groups, each group covering a time interval less than the interline blanking period and preferably less than the line synchronising pulse period, and wherein each group is mixed, if necessary after being further delayed, with the television waveform so as to occur in the composite waveform during an interline blanking period and preferably during a line synchronising pulse period.

In order that the invention may be more clearly understood, reference will now be made to the accompanying drawings, in which.

Figures 1, 2, 3, 4:
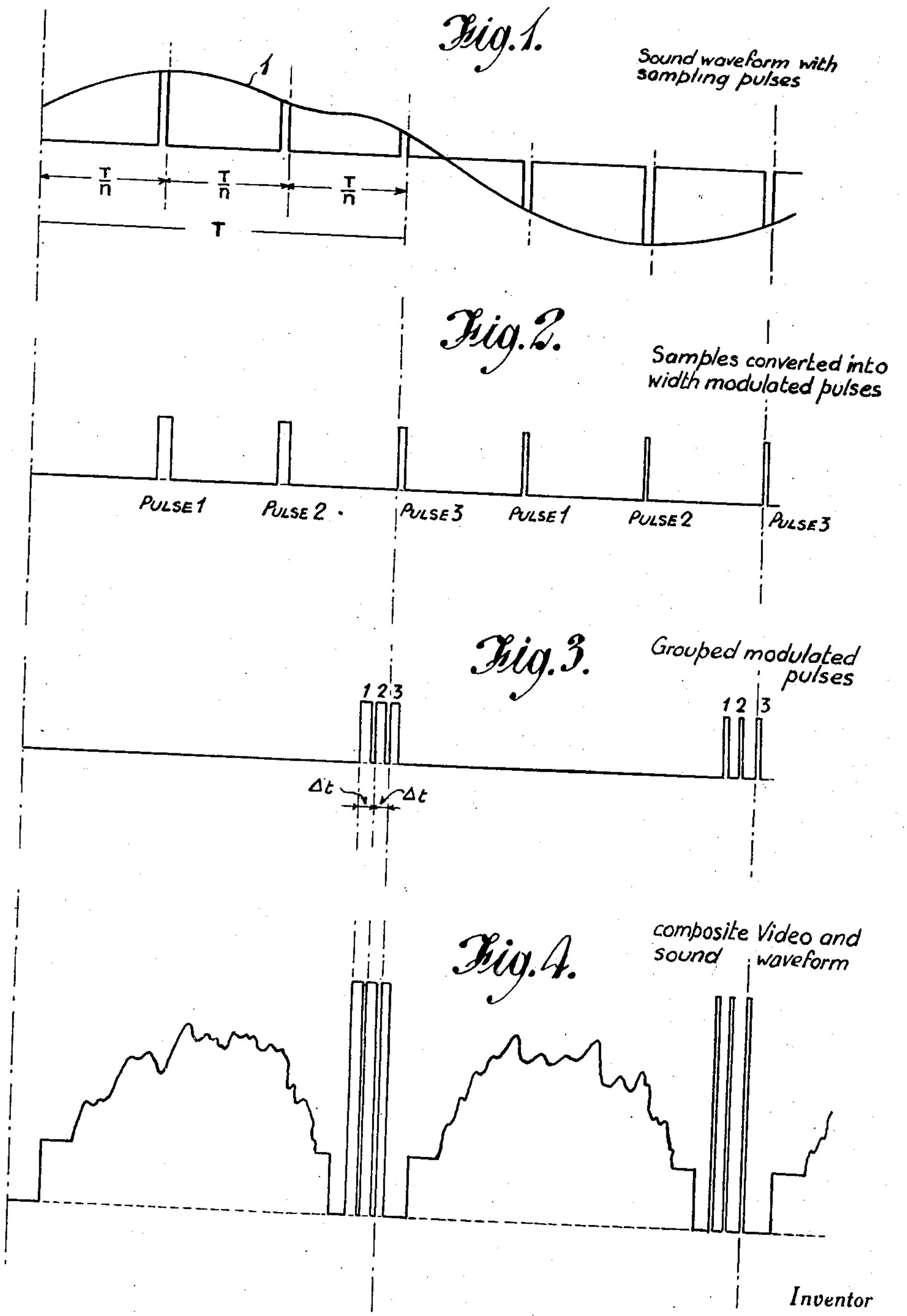
Fig. 1 shows a sound waveform with the sampling pulses.
Fig. 2 shows the samples converted into width modulated pulses.
Fig. 3 shows the width modulated pulses arranged in groups.
Fig. 4 shows the composite video and sound waveform with the grouped pulses arranged in the line synchronising periods.

Referring to the accompanying drawing, the sound waveform illustrated at I in Fig. 1 is sampled at $n$ equal time intervals during each line period. The samples are converted into modulated pulses, for example width modulated pulses as shown in Fig. 2. These modulated pulses may be produced by a pulse generator run at the frequency at which the samples are taken, the width of the pulses generated being varied in accordance with the sound modulation applied thereto in accordance with the samples. The width modulated pulses are then diverted into $n$ separate channels so that all the first pulses during each successive line period are fed to one channel, all the second pulses during each line period to a second channel, and so on. This may be achieved in any convenient manner, for example by appropriate gating circuits.

In the channels the pulses fed thereto are delayed by different amounts so that, in a common output from the channels, a new waveform is produced consisting of pulses in groups of $n$, each group covering a time duration less than the time duration of a line synchronising pulse. The waveform comprising these groups of pulses is shown in Fig. 3.

To produce these groups of pulses, the last pulse of each line period is fed through its channel without any delay being introduced. The last pulse but one is delayed in its channel by $$\frac{T}{n}-\Delta t$$

the last pulse but two is delayed in its channel by $$\frac{2T}{n}-2\Delta t$$

and so on. In general the $(n-k)$th pulse is delayed by $$\left(\frac{kT}{n}-k\Delta t\right)$$

where $T$=the time period of one line,
$n$=the number of pulses per line, and
$\Delta t$=the time separation of between pulses of the newly formed group of pulses.

The new waveform consisting of pulses in groups of $n$ is delayed to coincide with the synchronising pulse period. This latter delay may not be necessary if the time of sampling is chosen appropriately. The pulse group waveform is then superimposed on the television waveform to produce a composite television and sound waveform as shown in Fig. 4, which is transmitted. Each group of pulses should be so positioned in its corresponding synchronising pulse period that it does not interfere with the line synchronisation of the receiver.

After detection at the receiver, the sound pulses are separated from the picture intelligence and diverted into $n$ separate channels in which the pulses are again delayed by different amounts, the $(n-k)$th pulses being delayed by $$\left[\frac{n-1-kT}{n}-(n-1-k)\Delta t\right]$$

These separate channels in the receiver are fed to a common output circuit in which the pulses will again be equidistant, and after passing through a low pass filter or other demodulator the sound intelligence contained in the pulses can be used to operate a sound reproducing device.

Figure 5:
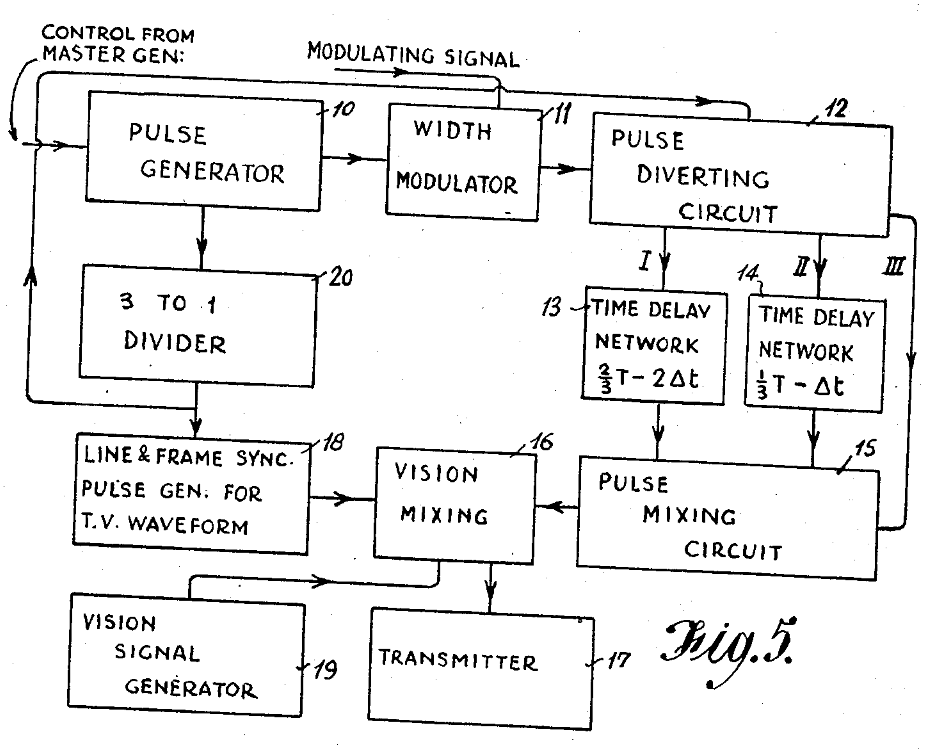
Fig. 5 shows a block circuit diagram of a transmitter according to the invention.

Fig. 5 is a block circuit diagram of the transmitter for the waveform shown in Fig. 4, and shows how the pulse generator 10, running at three times the line frequency, has its pulses modulated and delayed to produce the groups of modulated pulses as shown in Figure 3 which in turn are mixed with the television waveform and vision signal to produce the composite waveform shown in Fig. 4. The television waveform generator is synchronised by the pulse generator 10 through the three-to-one divider 20.

Figure 6:
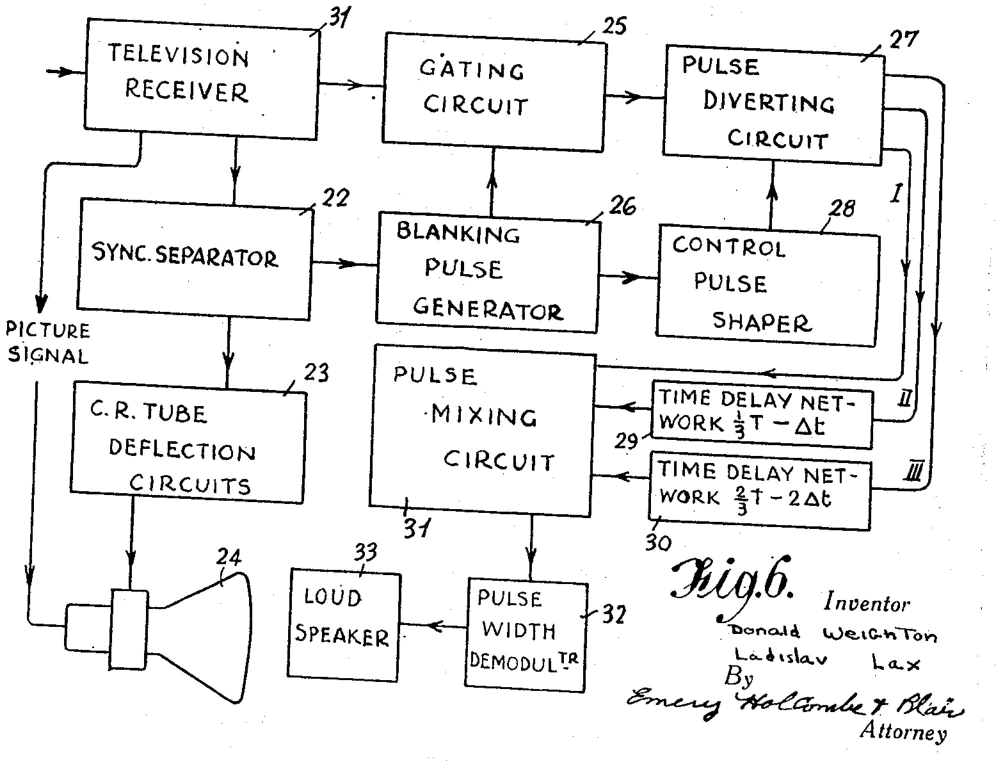
Fig. 6 shows a block circuit diagram of a receiver according to this invention.

Fig. 6 shows a block circuit diagram of a receiver and indicates how the picture is reconstituted and also how the sound pulses are separated out and fed through delay channels so as to become rearranged so as to produce a waveform corresponding to the original undelayed width modulated pulses for operating the loudspeaker.

We claim:

1. A combined television and sound system comprising means for sampling the sound waveform at a plurality of predetermined time instants during each line period, said instants being separated by time intervals exceeding the interline blanking periods, means for producing modulated pulses corresponding to the samples, a plurality of channels corresponding to the number of samples taken during each line period, means for diverting the modulated pulses successively through the separate channels so that the pulses corresponding to the first sample during each of the line periods are diverted into one channel, the pulses corresponding to the second sample during each of the line periods are diverted to the second channel and so on, means for time delaying the pulses in the different channels by different amounts so that the plurality of pulses corresponding to the samples of a single line period are arranged in groups in a common output from the channels, each group covering a time interval less than the interline blanking period of the television waveform, means for mixing the pulses of each group with the television waveform to produce a composite waveform in which each group occurs during an interline blanking period, means for transmitting the composite waveform, means for receiving the transmitted composite waveform, means for separating the sound pulses from the other signals of the received composite waveform, a plurality of separate channels at the receiver corresponding to the number of pulses in a group, means for diverting the pulses of each group successively through the different channels at the receiver so that the first pulses of each group are diverted into one channel, the second pulses of each group are diverted to a second channel and so on, means for delaying the pulses in the different channels by different amounts so that the plurality of pulses of a group become rearranged, in a common output from the channels, so as to occur at time intervals corresponding to the time intervals at which the samples were taken from the sound waveform, and means for demodulating the rearranged sound pulses to reproduce the original sound waveform.

2. A transmitter for a combined television and sound system, comprising means for producing a television waveform comprising video signals and line and frame synchronising signals, means for sampling the sound waveform to be transmitted at a plurality of predetermined time instants during each line period, said instants being separated by time intervals exceeding the interline blanking periods, means for producing modulated pulses corresponding to the samples, a plurality of channels corresponding to the number of samples taken during each line period, means for diverting the modulated pulses successively through the separate channels so that the pulses corresponding to the first sample during each of the line periods are diverted into one channel, the pulses corresponding to the second sample during each of the line periods are diverted to the second channel and so on, means for time delaying the pulses in the different channels by different amounts so that the plurality of pulses corresponding to the samples of a single line period are arranged in groups in a common output from the channels, each group covering a time interval less than the interline blanking period of the television waveform, means for mixing the pulses of each group with the television waveform to produce a composite waveform in which each group of pulses occurs during an interline blanking period and means for transmitting the composite waveform.

3. A receiver for a combined sound and television waveform in which groups of sound pulses corresponding to delayed samples of the sound taken during a line period occur during an interline blanking period, comprising means for separating the sound pulses from the other signals of the composite waveform, a plurality of separate channels at the receiver corresponding to the number of pulses in a group, means for diverting the pulses of each group successively through the different channels at the receiver so that the first pulses of each group are diverted into one channel, the second pulses of each group are diverted to a second channel and so on, means for delaying the pulses in the different channels by different amounts so that the plurality of pulses of a group become rearranged, in a common output from the channels, so as to occur at time intervals corresponding to the time intervals at which the samples were taken from the original sound waveform, and means for demodulating the rearranged sound pulses to reproduce the original sound waveform.

4. A transmitter for a combined television and sound system, comprising means for producing a television waveform comprising video signals and line and frame synchronising signals, means for generating a train of pulses at a repetition frequency which is a multiple of the line repetition frequency, means for width modulating said train of pulses in accordance with the sound waveform to be transmitted, a plurality of channels corresponding to the number of pulses occurring during each line period, means for diverting the modulated pulses successively through the separate channels so that all the first pulses of each of the line periods are diverted into one channel, all the second pulses of each of the line periods are diverted into the second channel and so on, means for time-delaying the pulses in the different channels by different amounts so that the plurality of pulses corresponding respectively to successive individual line periods are arranged in successive groups in a common output from the channels, each group covering a time interval less than the interline blanking period of the television waveform, means for mixing the pulses of each group with the television waveform to produce a composite waveform in which each group of pulses occurs during the interline blanking period, and means for transmitting the composite waveform.

5. A transmitter for a combined television and sound system comprising means for generating a train of pulses at a repetition frequency which is a multiple of the line repetition frequency, means controlled by said train of pulses for producing a television waveform comprising line synchronising pulses and frame synchronising pulses, means for width-modulating said train of pulses in accordance with the sound waveform to be transmitted, a plurality of channels corresponding to the number of pulses occurring during each line period, means for diverting the modulated pulses successively through the separate channels so that all the first pulses of each of the line periods are diverted into one channel, all the second pulses of each of the line periods are diverted into the second channel and so on, means for time-delaying the pulses in the different channels by different amounts so that the plurality of pulses corresponding respectively to successive individual line periods are arranged in successive groups in a common output from the channels, each group covering a time interval less than the interline blanking period of the television waveform, means for mixing the pulses of each group with the television waveform to produce a composite waveform in which each group of pulses occurs during an interline blanking period, and means for transmitting the composite waveform.

DONALD WEIGHTON.
LADISLAV LAX.

References Cited in the file of this patent

UNITED STATES PATENTS

| Number | Name | Date |
|---|---|---|
| 2,089,639 | Bedford | Aug. 10, 1937 |
| 2,590,306 | Fredendall et al. | Mar. 25, 1952 |